US005201037A

United States Patent [19]

Kohiyama et al.

[11] Patent Number: 5,201,037

[45] Date of Patent: Apr. 6, 1993

[54] MULTI-PORT MEMORY AS A FRAME BUFFER

[75] Inventors: Tomohisa Kohiyama, Yokohama; Shigeru Murasaki, Narashino; Yukihiro Seki, Yokohama; Yoshiaki Kitazume, Sayama, all of Japan

[73] Assignee: Hitachi, Ltd., Tokyo, Japan

[21] Appl. No.: 430,952

[22] Filed: Oct. 31, 1989

Related U.S. Application Data

[63] Continuation of Ser. No. 42,704, Apr. 27, 1987, abandoned.

[30] Foreign Application Priority Data

Apr. 28, 1986 [JP] Japan ................................ 61-96758

[51] Int. Cl.[5] .......................... G06F 3/14; G06F 13/00

[52] U.S. Cl. .................................. 395/164; 364/927.2; 364/939.7; 364/964.31; 364/DIG. 2; 395/425; 395/725

[58] Field of Search ... 364/200 MS File, 900 MS File; 395/164, 162, 425, 725

[56] References Cited

U.S. PATENT DOCUMENTS

| | | | |
|---|---|---|---|
| 4,412,294 | 10/1983 | Watts et al. | 364/518 |
| 4,663,735 | 5/1987 | Novak et al. | 364/900 |
| 4,665,495 | 5/1987 | Thaden | 364/518 |
| 4,667,190 | 5/1987 | Fant | 340/747 |
| 4,689,741 | 8/1987 | Redwine et al. | 364/200 |
| 4,720,819 | 1/1988 | Pinkham et al. | 365/219 |
| 4,777,481 | 10/1988 | Craver | 340/703 |
| 4,779,144 | 10/1988 | Dischert et al. | 358/334 |
| 4,811,205 | 3/1989 | Normington et al. | 364/900 |
| 4,833,657 | 5/1989 | Tanaka | 365/230.04 |
| 4,855,959 | 8/1989 | Kobayashi | 365/239 |

OTHER PUBLICATIONS

Eiichi Kumagai et al. "Dual-port Memory and Gate Arrays" *Nikkei Electronics*, No. 398, Jun. 30, 1986, pp. 1-14.

*Primary Examiner*—Thomas C. Lee
*Assistant Examiner*—Ayni Mohamed
*Attorney, Agent, or Firm*—Antonelli, Terry, Stout & Kraus

[57] ABSTRACT

A display system uses a dual-port memory having a random access memory part and a serial access memory part as a frame buffer. Display data is transferred from the random access memory part to the serial access memory part in response to a timing signal of the data transfer. Just prior to the timing signal, an access start disable signal is generated, which has an active period being equal to or longer than an access cycle time of drawing data. When the access start disable signal is active, a draw access from a central processing unit, etc. to the dual port memory becomes disable. Further, address bits for a column of the memory are detected to become all zero and a predetermined value, so that the timing of a real time data transfer and the access start disable signal for the real time data transfer can be generated.

25 Claims, 11 Drawing Sheets

FIG. 9A

| RASTER NUMBER | COLUMN POSITION | RASTER NUMBER | COLUMN POSITION | RASTER NUMBER | COLUMN POSITION | RASTER NUMBER | COLUMN POSITION | RASTER NUMBER | COLUMN POSITION |
|---|---|---|---|---|---|---|---|---|---|
| 3 | 46 | 7 | 22 | 10 | 68 | 14 | 44 | 18 | 20 |
| 21 | 66 | 25 | 42 | 29 | 18 | 32 | 64 | 36 | 40 |
| 40 | 16 | 43 | 62 | 47 | 38 | 51 | 14 | 54 | 60 |
| 58 | 36 | 62 | 12 | 65 | 58 | 69 | 34 | 73 | 10 |
| 76 | 56 | 80 | 32 | 84 | 8 | 89 | 54 | 91 | 30 |
| 95 | 6 | 98 | 52 | 102 | 28 | 106 | 4 | 109 | 50 |
| 113 | 26 | 117 | 2 | 120 | 48 | 124 | 24 | 132 | 46 |
| 136 | 22 | 139 | 68 | 143 | 44 | 147 | 20 | 150 | 66 |
| . . . | . . . | . . . | . . . | . . . | . . . | . . . | . . . | . . . | . . . |

FIG. 9B

| RASTER NUMBER | COLUMN POSITION | RASTWE NUMBER | COLUMN POSITION | RASTER NUMBER | COLUMN POSITION | RASTER NUMBER | COLUMN POSITION | RASTER NUMBER | COLUMN POSITION |
|---|---|---|---|---|---|---|---|---|---|
| 4 | 16 | 7 | 32 | 10 | 48 | 13 | 64 | 20 | 16 |
| 23 | 32 | 26 | 48 | 29 | 64 | 36 | 16 | 39 | 32 |
| 42 | 48 | 45 | 64 | 52 | 16 | 55 | 32 | 58 | 48 |
| 61 | 64 | 68 | 16 | 71 | 32 | 74 | 48 | 77 | 64 |
| 84 | 16 | 87 | 32 | 90 | 48 | 93 | 64 | 100 | 16 |
| . . . | . . . | . . . | . . . | . . . | . . . | . . . | . . . | . . . | . . . |

FIG. 13A
FIG. 13B
FIG. 13C
FIG. 13D
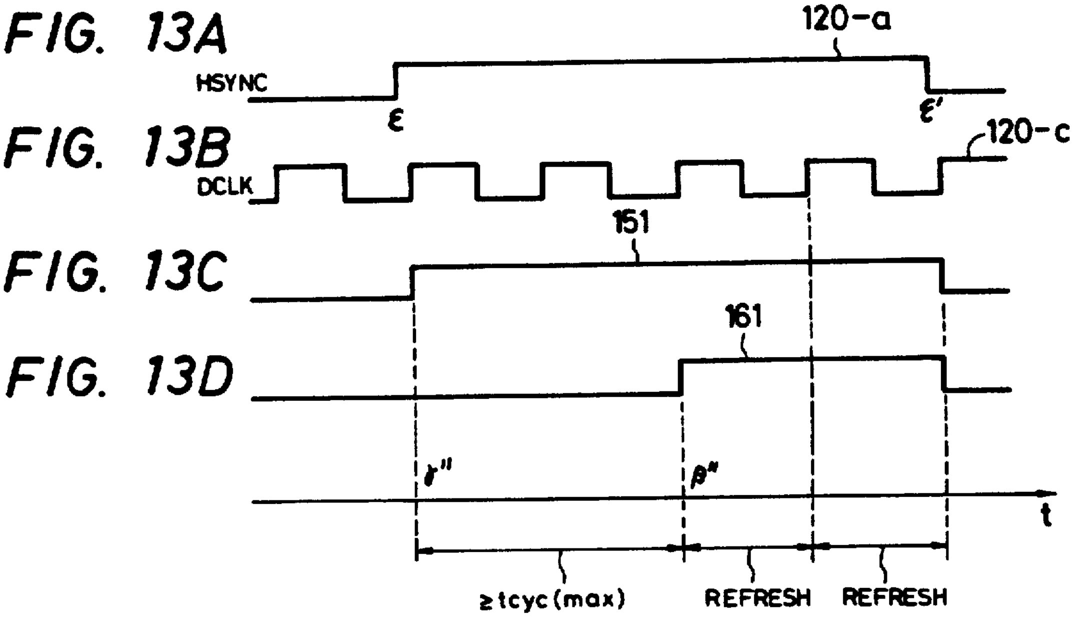
FIG. 14
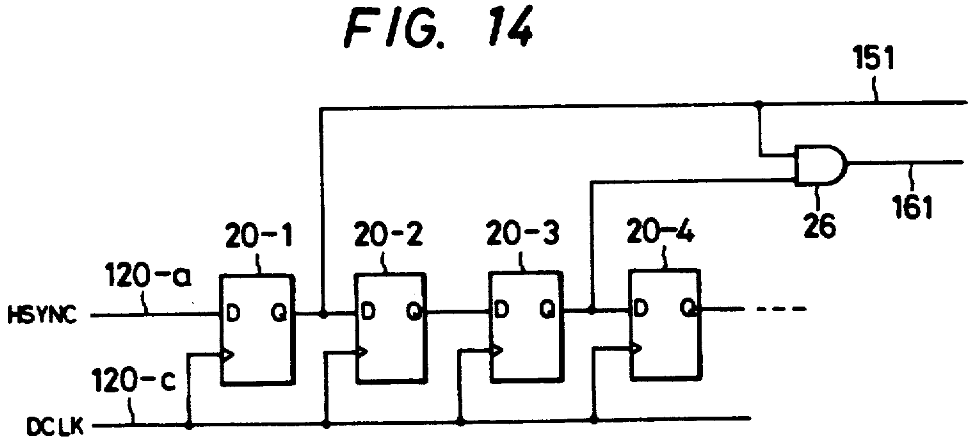

MULTI-PORT MEMORY AS A FRAME BUFFER

This is a continuation of application Ser. No. 042,704, now abandoned, filed Apr. 27, 1987.

BACKGROUND OF THE INVENTION

The present invention relates to a display system using a multiport memory as a frame buffer, especially a display system having means for drawing display data into the frame buffer asynchronously with reading out display data from the frame buffer for display.

In a prior art display system using a single-port memory as a frame buffer, it has been necessary to serially read out display data from the frame buffer. (This read out operation is called a read access for display, hereinafter.) Therefore, in order to draw display data into the frame buffer by a CPU (central processing unit), DMAC (direct memory access controller), etc., during the display, a time sharing of a read access for display cycle and a draw access cycle has been used, or the draw access cycle is executed during horizontal and vertical blanking periods. Namely, the read access for display has priority to the draw access, which is allotted during specially determined time slots.

In contrast, dual-port memories have recently become available to users in this technical area. The dual-port memories can be randomly accessed in parallel, and further sequentially accessed. That is, the dual port memory has a serial access memory part which is able to operate asynchronously and independently to a random access memory part thereof. Generally, the read access for a display is sequentially executed. Therefore, if the display data is transferred to the serial access memory part at first and sequentially read out, the draw access to the random access memory part can be done except data transfer periods to the serial access memory part, so that it become possible to make the draw access speed to the random access memory part higher. The dual port memories in the prior art are described, for example, in U.S. Pat. Nos. 4,347,587 and 4,498,155, etc.

In the display system using the dual port memories as the frame buffer, as mentioned above, it is possible to access the random access memory part for drawing except the data transfer periods from the random access memory part to the serial access memory part. In these type of memories, the data transfer time is the same as or nearly equal to the draw access cycle time. As a result, in this system, the draw access becomes to have priority over the read access for display.

In general, the draw access is generated asynchronously to the read access for display. Therefore, it is natural that timings for drawing data into the memories are generated asynchronously to timings for displaying data. Because, the timings of the read access for display are parameters based on a display apparatus, and the timings of the draw access are based on a clock frequency of the CPU for drawing data into the frame buffer.

However, since, in the prior display system using the dual port memories, there is no consideration in the asynchronousness, it is impossible to execute the read access for display cycle and the draw access cycle asynchronously. Therefore, there remain some problems in a case that the draw access arises near the timing of the read access for display.

FIG. 1 illustrates the timings in which the data transfer B occurs at the timing $\beta$ during the draw access A. In this case, the draw access A is executed normally, but the data transfer B can not be started at the timing $\beta$, so that noise of display screen is generated. Since in the dual port memory the display data is serially read out from the serial access memory part during the read access for display, the noise of display screen remains until the next data transfer is executed normally. Namely, in the prior display system using the dual port memories, there remains some possibility that the data transfer of the read access for display can not be executed perfectly.

SUMMARY OF THE INVENTION

It is an object of the present invention to provide a display system using multi-port memories, in which timings of drawing display data in the memories are asynchronous to timings of reading out the display data.

It is another object of the invention to provide a display system using multi-port memories, in which a read access for display is normally executed in any time, asynchronous to a timing of a draw access.

In order to accomplish to above objects in the present invention, an access start disable signal is generated just prior to a timing of a data transfer by using a synchronizing signal from a display controller and the draw access is kept waiting, when the access start disable signal is active.

Further, in order to execute a real time read access for display, when all address bits for a column of multi-port memory become zero, a real time data transfer is executed. Also, the access start disable signal is generated based on the address bits for the column of the multi-port memory just prior to the real time data transfer.

If the draw access would start prior to the timing of the data transfer, the draw access should finish before the request of the data transfer comes, in order to normally start the timing of the data transfer. In the present invention, because of waiting the draw access until the end of data transfer cycle, the both accesses can be executed normally. As a result, even if display circuits and drawing circuits are operated asynchronouly, there is no fault of the data transfers, so that noise of display screen is not generated.

Further, since the timings for the data transfer cycle and the timings for the access start disable are produced by the synchronizing signal from the display controller, there is only a little increase of the circuit.

Further, by using the address bits for the column from the display controller, the real time data transfer becomes possible. That is, when the address bits for the column of the multi-port memory are detected to become all zero, the timing of the real time data transfer is generated. Also, when the address bits for the column of the multiport memory are detected to become a predetermined value (not zero), the access start disable signal for the real time data transfer is generated.

Still further, according to the present invention, a refresh operation for a multi-port memory can be executed without competing with the draw access by using an access start disable signal for a refresh just prior to a refresh timing signal generated during a blanking period for display. The access start disable signal for the refresh is also produced by the synchronizing signal from the display controller.

BRIEF DESCRIPTION OF THE DRAWINGS

FIGS. 9A and 9B show relation between raster numbers and column positions for a real time data transfer in the embodiment shown in FIG. 8.

FIGS. 13A to 13D illustrate waveforms for explaining another embodiment of the present invention, and FIG. 14 shows a block diagram of another embodiment of the present invention.

DETAILED DESCRIPTION OF THE PREFERRED EMBODIMENTS

Figure 2:
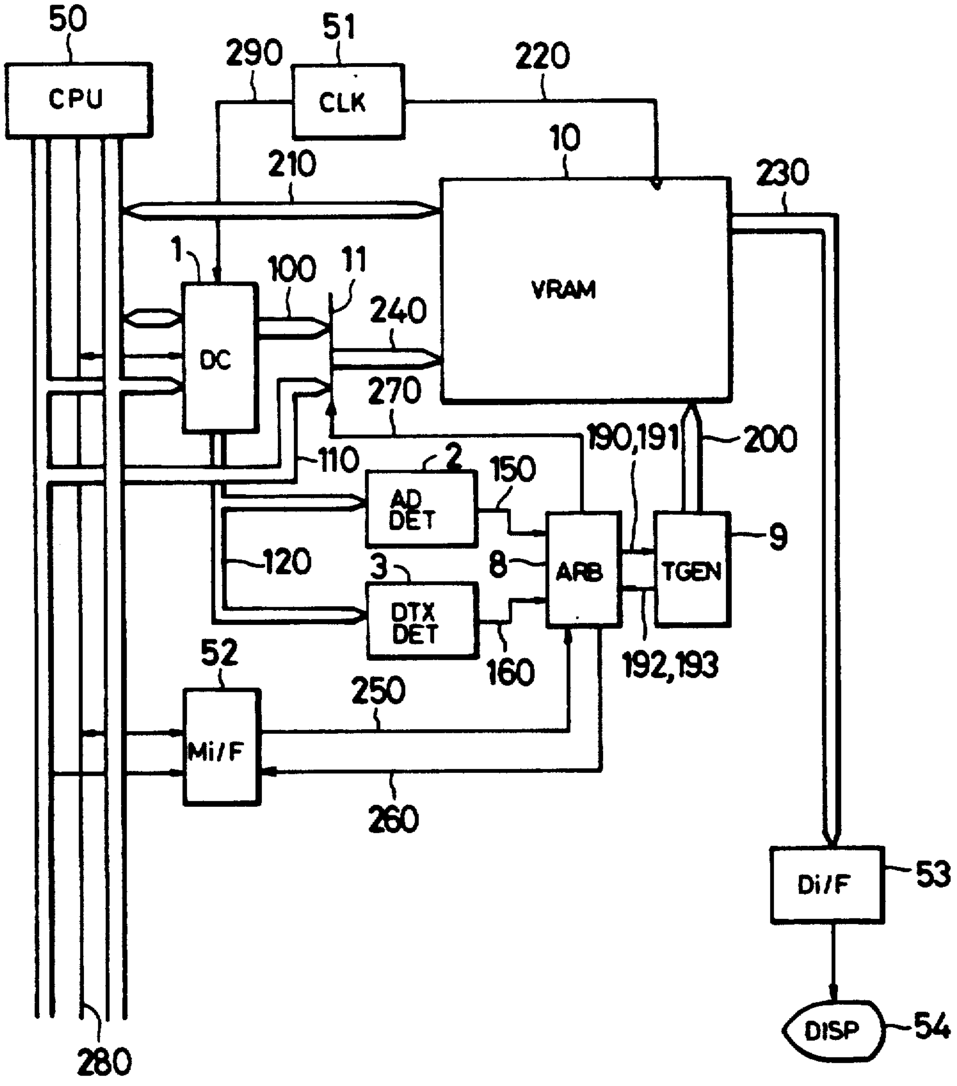
FIG. 2 shows a block diagram of an embodiment of the present invention.

FIG. 2 shows a block diagram of an embodiment of a display system of the present invention. Referring to FIG. 2, a frame buffer (hereinafter, VRAM) 10 is constructed by dual-port memories. The numerals 1, 2 and 3 denote a display controller (hereinafter, DC), a detecting circuit of access start disable signals (hereinafter, AD-DET), and a detecting circuit of data transfer timings (hereinafter, DTX-DET), respectively. The numeral 11 denotes a multiplexer (hereinafter, MPX). The numerals 50, 51, 52, 53 and 54 designate a central processing unit (hereinafter, CPU), a clock generator for display (hereinafter, CLK), a memory access interface circuit for accessing the VRAM10 by the CPU50 (hereinafter, Mi/F), a display interface circuit for converting the display data being read out from the VRAM10 a suitable format (hereinafter, Di/F), and a display (hereinafter, DISP), respectively. The numerals 200, 220, 230 and 240 denote an access control signal, a serial read clock, a read data bus and an address bus of the VRAM10, respectively. A frame buffer bus arbiter (hereinafter, ARB) 8 arbitrates access right of the VRAM10 in response to the outputs of the AD-DET2, the DTX-DET3 and the Mi/F52. A timing generator (hereinafter, T-GEN) 9 generates control signals of the VRAM10 in response to the outputs 190 and 191 of the ARB8.

Figure 3:
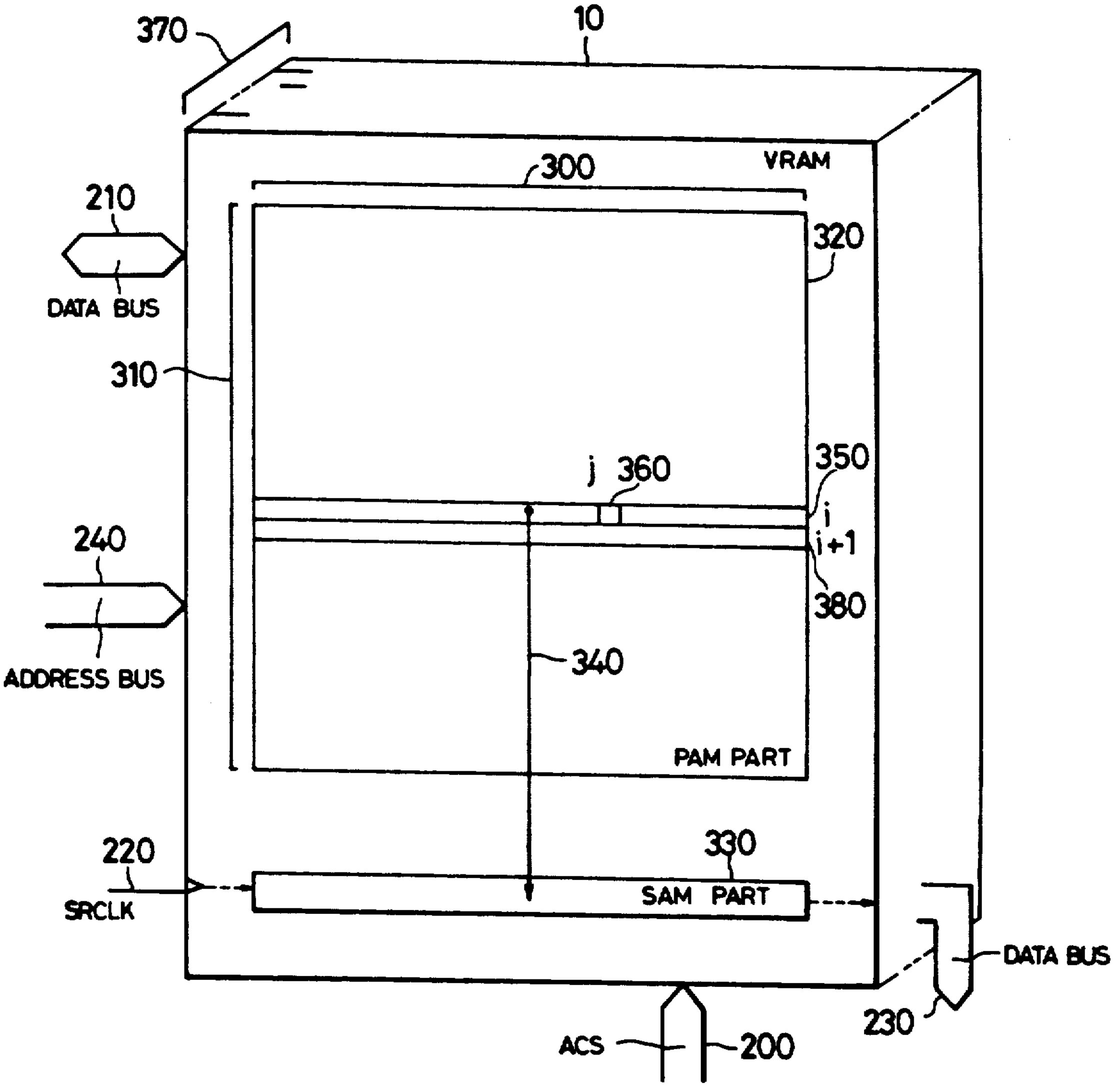
FIG. 3 illustrates a schematic diagram of the dual port memories.

First, the data transfer of the VRAM10 will be explained by using FIG. 3. Referring to FIG. 3, the VRAM10 is divided into a random access memory part (hereinafter, RAM part) 320 and a serial access memory part (hereinafter, SAM part) 330. The RAM part 320 is constructed by $2^m$ rows 310 and $2^n$ bits columns and has $2^{m+n}$ memory cells, where m and n are natural numbers. The SAM part 330 has a capacity of bit numbers of one row ($2^n$ bits). The data transfer means that data of a selected row is transferred to the SAM part 330 in parallel. For example, at the data transfer mode, the i-th row 350 and the j-th column position 360 are designated via the address bus 240 and the timing for the data transfer is delivered as the ACS 200, so that the data of the i-th row 350 is transferred into the SAM part 330 as being indicated by an arrow 340. After that the transferred data is sequentially read out from the j-th column position in response to the SRCLK220 and supplied to the data bus 230.

Second, by using FIGS. 4A and 4B, the operation of the embodiment shown in FIG. 2 will be explained below.

Figure 4A:
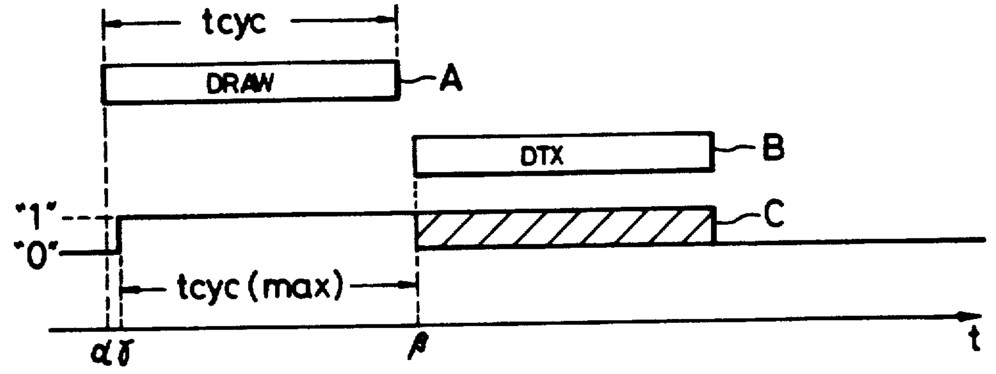
FIGS. 4A and 4B illustrate timing charts for explaining the present invention.
Figure 4B:
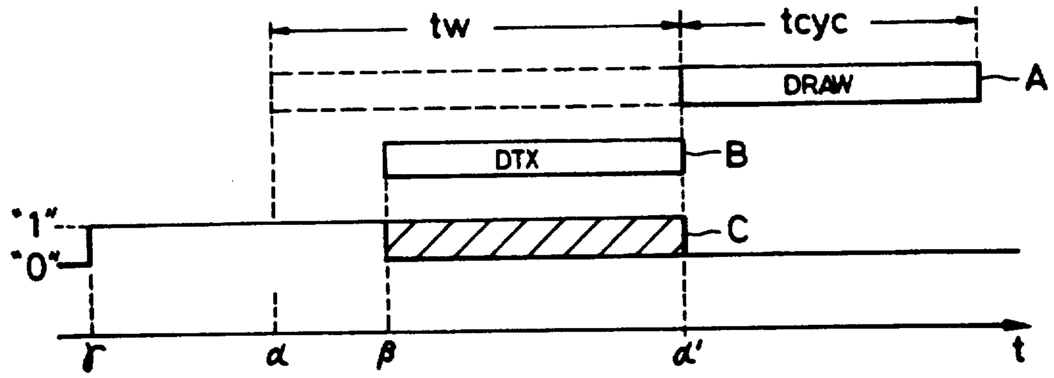

Referring to FIGS. 4A and 4B, C indicates an access start disable signal delivered from the AD-DET2. The disable signal C is active during "1" level. In FIG. 4A, the timing $\alpha$ at which the draw access A starts is prior to the timing $\gamma$ at which the diable signal C becomes active. In FIGS. 4A and 4B, $t_{cyc}$ shows a cycle time of the draw access A. In this case, if a time interval $t_{cyc}$ (max) between the timing $\gamma$ and the start timing $\beta$ of the data transfer B is set to be equal to or larger than $t_{cyc}$, that is, $$t_{cyc}(\max) \geqq t_{cyc},$$

the draw access A absolutely terminates prior to the start timing $\beta$ of the data transfer B.

In FIG. 4B, the draw access A generates after the timing $\gamma$ and prior to the timing $\beta$. At the timing $\alpha$, the disable signal C is active, so that the start of the draw access is postponed to a timing $\alpha'$, which corresponds to the terminal timing of the data transfer B. As a result, the data transfer cycle B exactly starts at the timing $\beta$ and the draw access A is executed normally.

Figure 1:
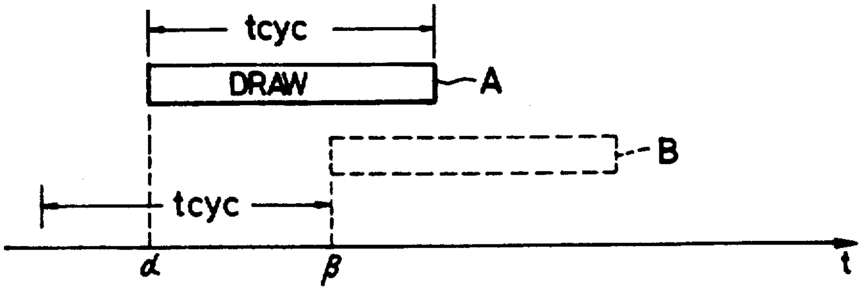
FIG. 1 illustrates a timing chart for explaining some problems remained in the prior art display system using a dual port memory.

Although the access start disable signal from the AD-DET2 is explained in a high-active logic, it is possible to use a low-active logic. Further, at oblique lined parts in FIGS. 4A and 4B, the disable signal is able to be active or inactive. Namely, since during the oblique lined parts the data transfer cycle B is being executed, the ARB 8 shown in FIG. 1 is constructed, as will be explained later, to inhibit another accesses until the end of the cycle. In this case, a request of the draw access generated during the oblique lined parts is normally executed after the data transfer cycle B.

As being described in detail above, according to the embodiment of the present invention, it is possible to operate the CPU50 and the DC10 asynchronously by using the AD-DET2.

Figure 5:
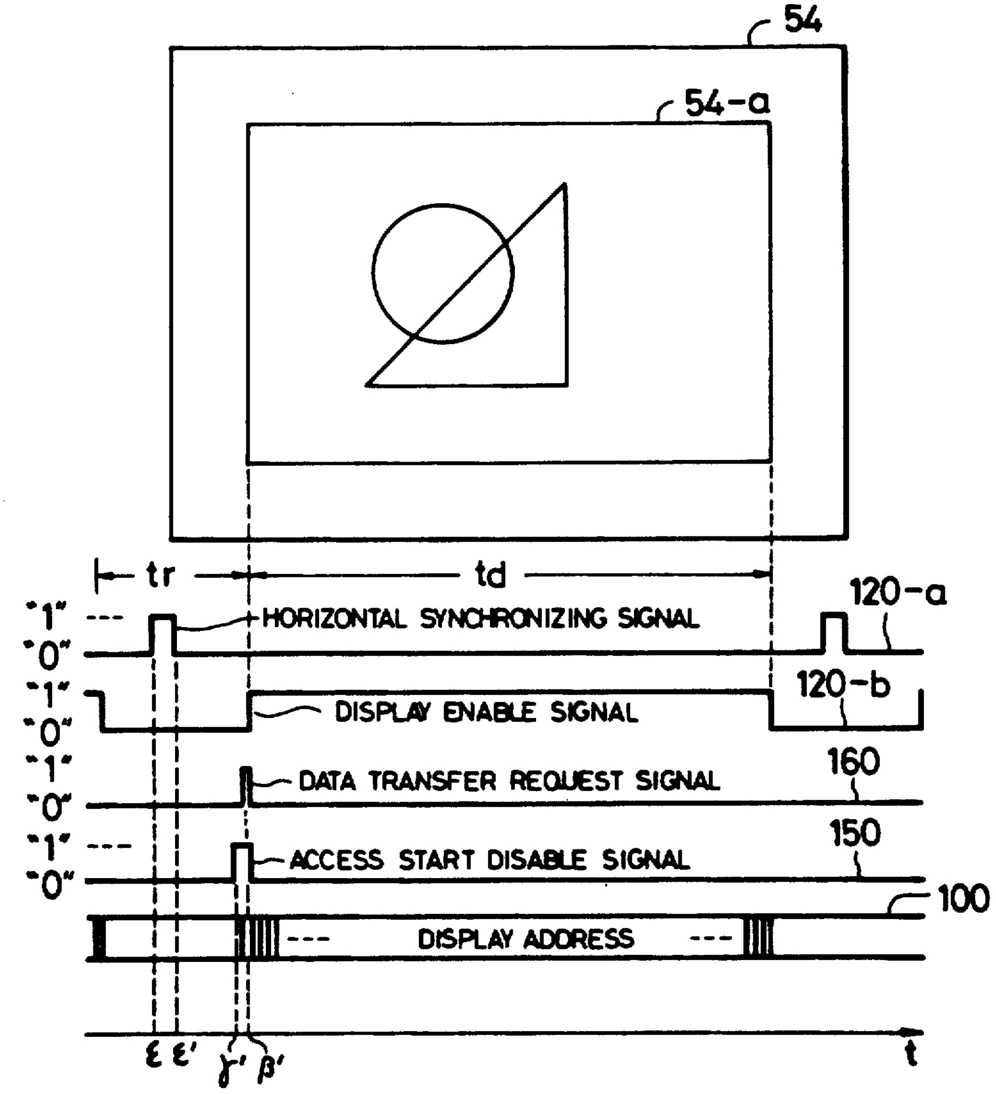
FIG. 5 shows main waveforms corresponding to a display area of a display screen for explaining operation of the embodiment shown in FIG. 2.

Next, relation between the AD-DET2, the DTX-DET3 and display control signals 120 is described in detail. FIG. 5 illustrates the relation between a display screen and timings of signals in a case that a raster scan type CRT display is used as the DISP54. The numeral 54-*a* denotes a display area in which a picture or characters are displayed. The numerals 120-*a* and 120-*b* designate a horizontal synchronizing signal (HSYNC) and a display enable signal indicating the display area, respectively. These signals are contained in display control signals 120 delivered from the DC1. The numerals 150, 160 and 100 indicate the access start disable signal from the AD-DET2, a data transfer request signal, and a display address signal of the VRAM10 supplied from the DC1, respectively. In order to display data by using the dual-port type VRAM10, it is necessary to initially execute the data transfer from the RAM part 320 to the SAM part 330 in parallel. The data transfer as the initial set must be done at a timing $\beta'$ shown in FIG. 5. The timing $\beta'$ coincides with a timing at which the DC1 outputs the first display address signal 100 for each horizontal scan. However, it is impossible to generate a timing $\gamma'$ which is $t_{cyc(max)}$ prior to the timing $\beta'$.

In general, it is possible for a circuit designer to determine a time interval from a timing $\epsilon$ or $\epsilon'$, at which the horizontal synchronizing signal 120-*a* becomes active or inactive, respectively, to the timing $\beta'$ at which the first display address signal for each horizontal scan is supplied. Namely, since the designer can know the timer intervals from the timing $\epsilon$ or $\epsilon'$ to the timings $\gamma'$ and $\beta'$, the data transfer request signal 160 and the access start disable signal 150 can be generated with delay circuits from the horizontal synchronizing signal 120-*a*.

Figure 6:
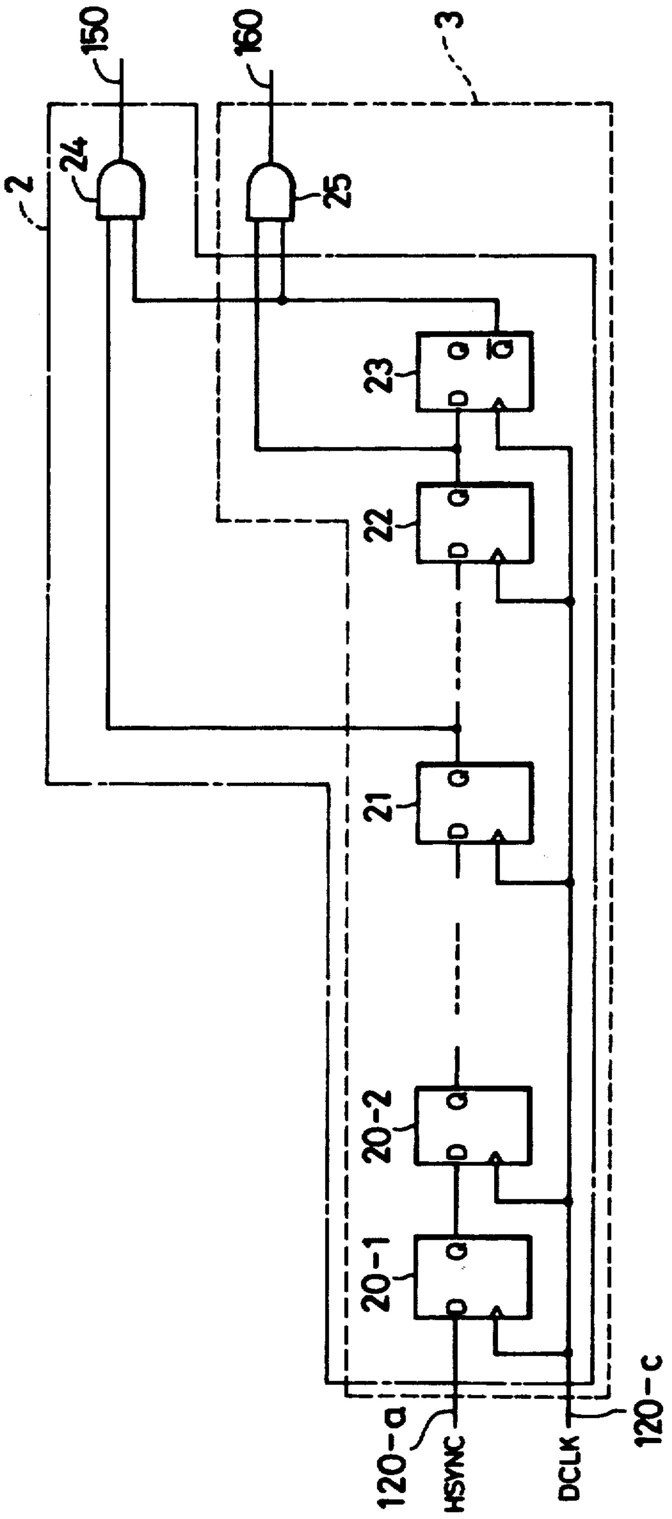
FIG. 6 shows a circuit diagram of a detecting circuit 2 of access start disable signals and a detecting circuit 3 of a detecting circuit 3 of data transfer timings shown in FIG. 2, FIGS. 7A and 7B illustrate schematic diagrams for explaining relation between a display area and a frame buffer.

The AD-DET2 and the DTX-DET3 can be constructed from a shift register, a counter, etc. FIG. 6 shows a circuit diagram of an embodiment of the AD-DET2 and the DTX-DET3 using a shift register. The numerals 20 to 23 denote D type flip flops (FFs). The numerals 24 and 25 designate AND gates. Further, the numeral 120-C indicates a display clock (DCLK) synchronized with the read access for display. The FFs 20 to 23 are commonly used in the AD-DET2 and the DTX-DET3.

The leading edge of the HSYNC 120-*a* is transferred through the FFs 20 and provided to the FF21, so that the access start disable signal 150 is output from the AND gate 24. Further, when the leading edge is transferred to the FF22, the data transfer request signal 160 is output from the AND gate 25. Therefore, it is possible for the circuit designer to make the timing signals shown in FIG. 5 by adjusting a number of FFs 20 to 23.

Figure 7A:
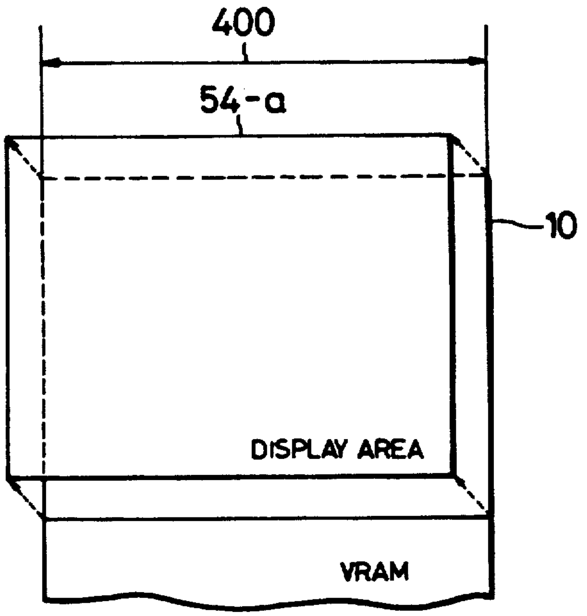
Figure 7B:
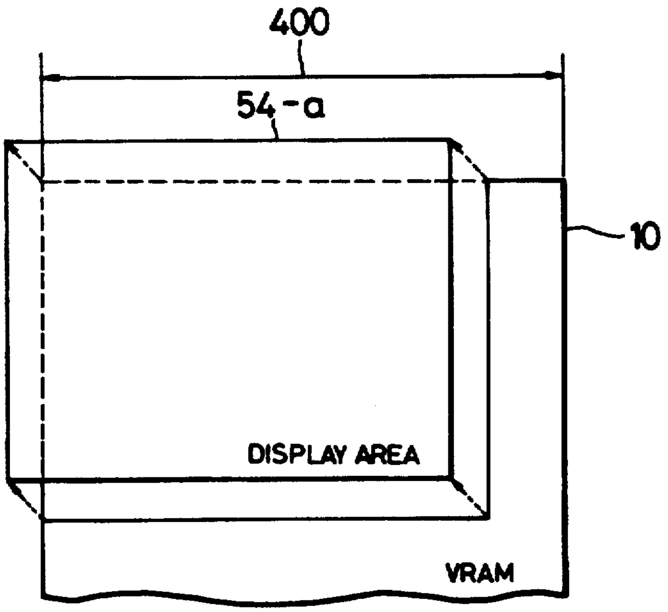

FIGS. 7A and 7B illustrate the relation between the display area 54-*a* and the VRAM10 which is illustrated in a two-dimensional structure. The read access for display of the VRAM10 is executed by reading data from the left side to the right side for each horizontal scan and from the upper side to the lower side for each vertical scan.

FIG. 7A shows a case in which a horizontal memory width of the VRAM10 is equal to a horizontal width of the display area 54-*a*, and FIG. 7B shows a case in which the horizontal memory width is larger than the horizontal width of the display area 54-*a*. If a non-interlace scanning is executed in FIG. 7A and the SRCLK 220 is stopped during a non display period (tr) shown in FIG. 5, the data transfer as the initial set is done only at the left upper edge of FIG. 7A each frame scan. Except for the case, the data transfer as the initial set must be executed every horizontal scan, for example, in the case shown in FIG. 7B, by using the circuit shown in FIG. 6.

Figure 8:
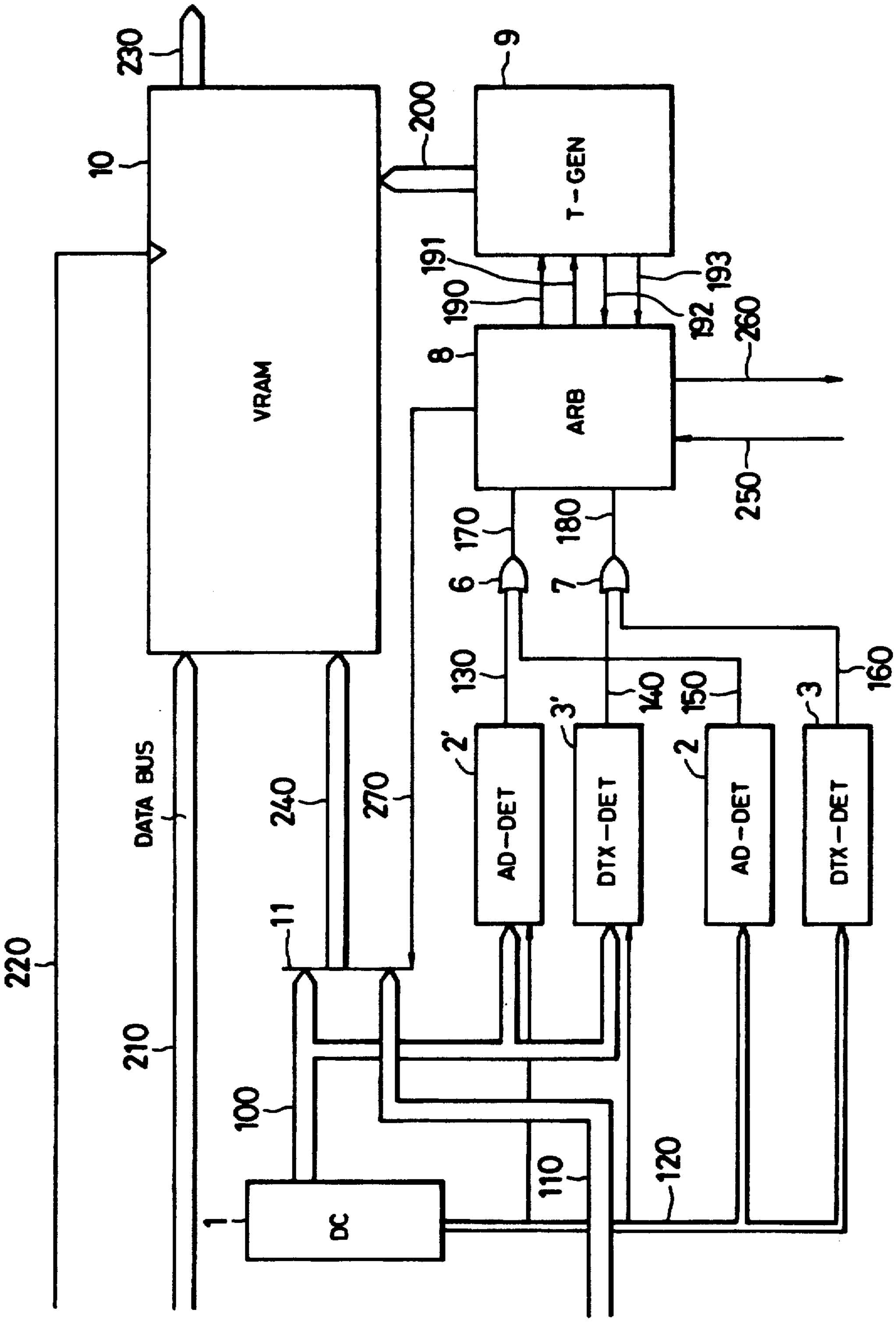
FIG. 8 shows a block diagram of another embodiment of the present invention.

FIG. 8 shows a block diagram of another embodiment of the present invention, in which the real time data transfer can be executed. Referring to FIG. 8, the same numerals as FIG. 2 indicate the same circuits and signals in FIG. 2. The numerals 2' and 3' denote a second AD-DET and a second DTX-DET, respectively. The ARB8 receives signals 130 and 140 from the second AD-DET 2' and the second DTX-DET 3' via OR circuits 6 and 7 together with the timing signals from the AD-DET 2 and the DTX-DET3.

Returning to FIG. 3, the RAM part 320 and the SAM part 330 correspond to one data line of the data bus 210. Therefore, if the data bus 210 is constructed by 8 bits or 16 bits, there are 8 or 16 groups of the RAM part 320 and the SAM part 330 in a depth 370, respectively. If the number of the memory cells per one row is $2^n$, data corresponding to $2^n$ cycles of the SRCLK 220 is transferred to the SAM part 330 per one data transfer. However, in general, the memory width 400 shown in FIGS. 7B differs from the data amount transferred to the corresponding SAM part 330.

Namely, in general, the read access is executed at a different column position (j) 360 each horizontal scanning, wherein $0 \leq j \leq 2^n-1$, j is a natural number. In other words, data for one horizontal scanning is stored in two adjacent rows 310, for example, the i-th row 350 and the (i+1)th row 380. In this case, it is necessary to transfer data of the (i+1)th row 380 to the SAM part 330 and read the transferred data from the first column position (j=0) just after the data of the last column position ($j=2^n-1$) in the i-th row 350 has been read out. This data transfer is called the real time data transfer (hereinafter, R data transfer).

This embodiment relates to the R data transfer. FIGS. 9A and 9B show examples of column positions for the R data transfer. For example, the VRAM10 has 16 bits as the width of the data bus 210 and $2^8$ (equal to 256) as the bit number of one row 310, and the memory width 400 is 70 words (equal to 1120 pixels) which is equal to the horizontal width of the display area as shown in FIG. 7A. In this case, if the display is executed by non-interlace, it is necessary to do the R data transfer at designated column positions in FIG. 9A.

For another example, the VRAM10 has 8 bits as the width of the data bus 210 and $2^8$ as the bit number of one row 310, and the memory width 400 in FIG. 7B is 80 words (equal to 640 pixels). In this case, if the display is executed in non-interlace, it is necessary to do the R data transfer at column positions in FIG. 9B. Also, when the VRAM10 has 16 bits as the width of the data bus 210 and $2^8$ as the bit number of one row 310, and the memory width 400 in FIG. 7B is 80 words, it is necessary to do the R data transfer at column positions in FIG. 9B. In the cases shown in FIGS. 9A and 9B, the scan for the display is executed in non-interlace. If the scan for the display is executed in interlace, it becomes more complex. Therefore, it is difficult to construct the AD-DET2 and the DTX-DET3 based on the horizontal synchronizing signal.

Returning to FIG. 8, the column position (j) 360 is zero at the timings of the R data transfer. Namely, the R data transfer is executed, when all address bits for designating the column 300 of the RAM part 320, which is lower bits of the display address signal 100 supplied from the DC1 to the VRAM10, become zero. The data transfer request signal for the R data transfer can be generated, when all the address bits for the column 300 become zero.

Further, the access start disable signal can be generated by detecting a timing in which the address bits for the column become k bits (k is a natural number) prior to the R data transfer, that is, decoding the address bits (j) which are equal to or larger than $2^n-k-1$. As a time ($\Delta t_{chr}$) for counting up the display address by the DC1 and the access cycle $t_{cyc}$ (max) of the CPU50 can be known, the number k can be determined as follow, $$k \geq \left[ \frac{t_{cyc}(\max)}{t_{chr}} \right],$$

wherein [ ] indicates a mark for a round up under a decimal point.

Therefore, $t_{cyc}(\max)$ becomes below, $$t_{cyc}(\max) = k \times t_{chr}$$

Figure 10:
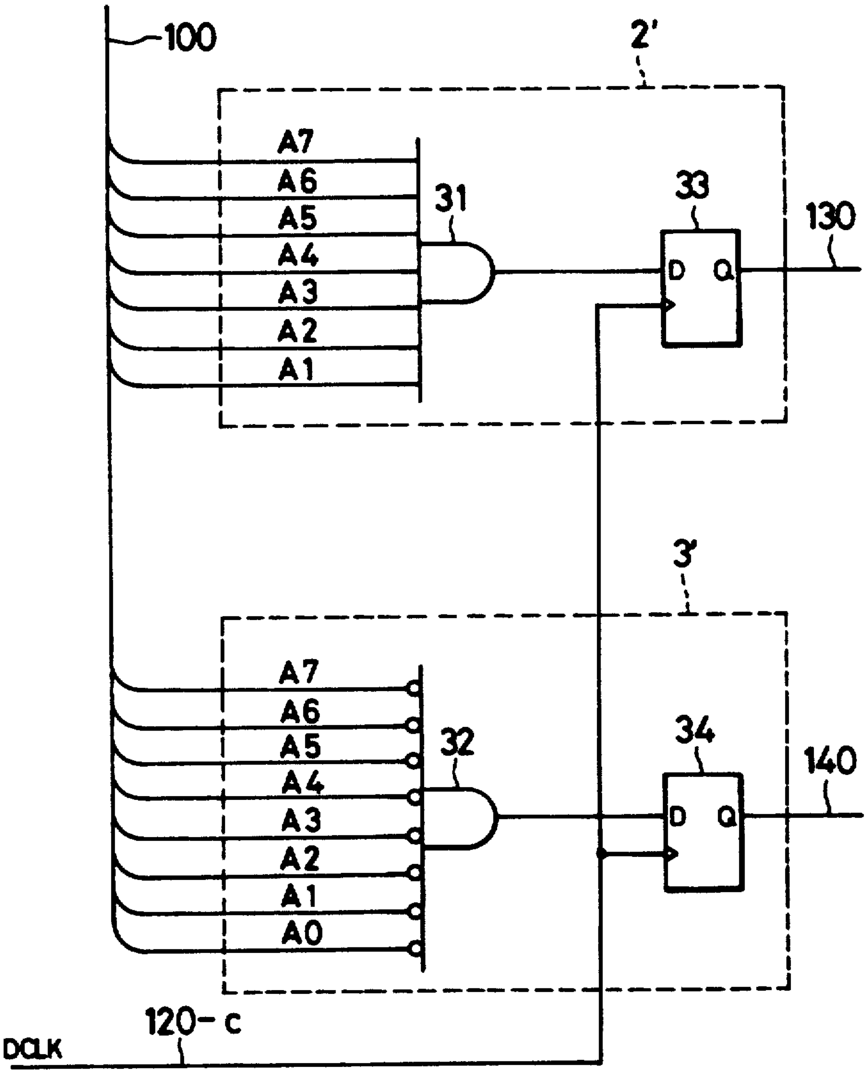
FIG. 10 shows a circuit diagram of a detecting circuit 2' of the access start disable signals and a detecting circuit 3' of the data transfer timings shown in FIG. 8.

Returning to FIG. 8, the AD-DET2' and the DTX-DET3' produce the timings for the R data transfer and deliver the output signals 130 and 140 to the OR circuits 6 and 7, respectively. The OR circuits 6 and 7 delivers an ORed access start disable signal 170 and an ORed data transfer request signal 180, respectively. FIG. 10 shows an embodiment of the AD-DET2' and the DTX-DET3'. Referring to FIG. 10, the numerals 31 and 32 denote a high-active logic input AND gate and a low-active logic input AND gate, respectively. The numerals 33 and 34 designate D type flip flops (FFs). When a bit number of the columns 300 is 256, a number of the address lines for the columns is 8.

When all the address lines for the columns become zero, the R data transfer is executed. The gate 32 detects all zero of the address lines for the columns. The gate 31 detects the 254th and 255th column positions. Namely, the gate 31 catches the timing which is $2 \cdot t_{chr}$ just prior to the R data transfer. It is possible to change the timing at which the access start disable signal is generated by modifying the gate 31. The FFs 33 and 34 are used for eliminating hazards contained in the outputs of the gates 31 and 32. Further, in order to set the trailing edge of the access start disable signal 130 at the end of the data transfer timing signal 140, an ORed output of the outputs of the gates 31 and 32 can be supplied to the FF33.

As being explained in detail above, in this embodiment, the data transfer for the initial set is executed each raster and the R data transfer can be executed during the horizontal scanning whenever the R data transfer is needed. Therefore, it becomes possible to increase time intervals for the draw access as long as possible. For the second advance, it becomes possible to use integrated circuits for a CRT controller of a standard single port memory, for example, HD6845, HD6344, HD6345 and HD63484 produced by Hitachi Ltd. μPD7220 produced by NEC Corp. in place of a specified display controller for the dualport memory. Further, for the third advance, it is possible to make the AD-DTX2' and the DTX-DET3' with a small hardware, because only n address lines, corresponding to the bit number $2^n$ of the columns of the RAM part 320, have to be decoded. Also, for the fourth advance in this embodiment, even if the memory width 400 is changed during display mode or the address for the read access is changed by scrolling, it is possible to trace the changes and guarantee a normal display operation.

Figure 11:
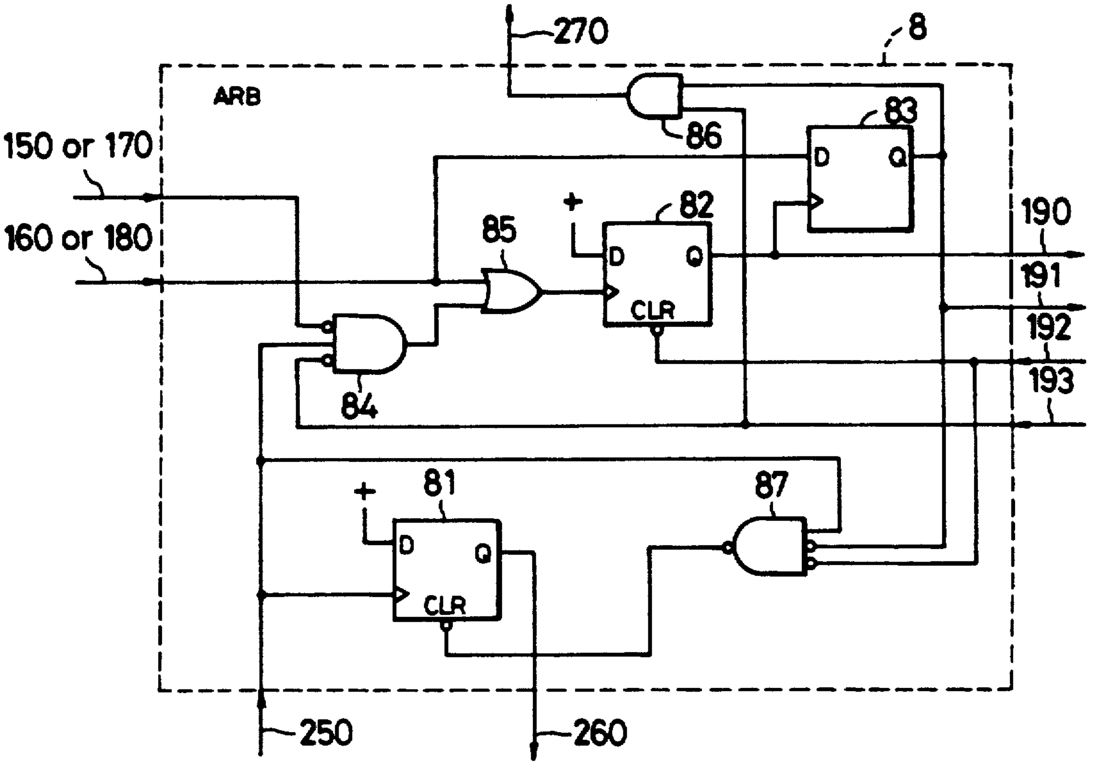
FIG. 11 shows a circuit diagram of a frame buffer bus arbiter 8 shown in FIGS. 2 and 8.

FIG. 11 shows a circuit diagram of an embodiment of the ARB8 shown in FIGS. 2 and 8. The numerals 81, 82 and 83 denote D type flip flops (FFs). The numerals 84, 86 and 87 designate AND gates, and the numeral 85 denotes an OR gate.

When an access request signal 250 is "1", there is the access request from the CPU50. When the access request is provided to the ARB8, an access grant signal 260 becomes "1" at once at the Q output of the FF81, and returns to "0" by the output of the AND gate 87 being delivered to the CLR terminal, if the access request is granted. The access start disable signal 150 or 170 is "1" during the disable period. The data transfer request signal 160 or 180 is "1", when the request occurs. The numerals 190 and 191 denote an access request signal to the T-GEN9 and a discriminating signal to the T-GEN9, respectively. The access request is executed at the leading edge of the access request signal. The discriminating signal 191 indicates whether the access request to the T-GEN9 is for the data transfer or the access from the CPU50. When the signal 191 is "1", it indicates the data transfer. The numeral 192 denotes a reply signal from the T-GEN9, which is normally "1" and becomes "0" during a predetermined period in reply. An access cycle signal 193 from the T-GEN9 becomes "1" when the T-GEN9 executes the access cycle. When an address switching signal 270 is "1", the MPX11 selects the address for the data transfer provided from the DC1.

Figure 12:
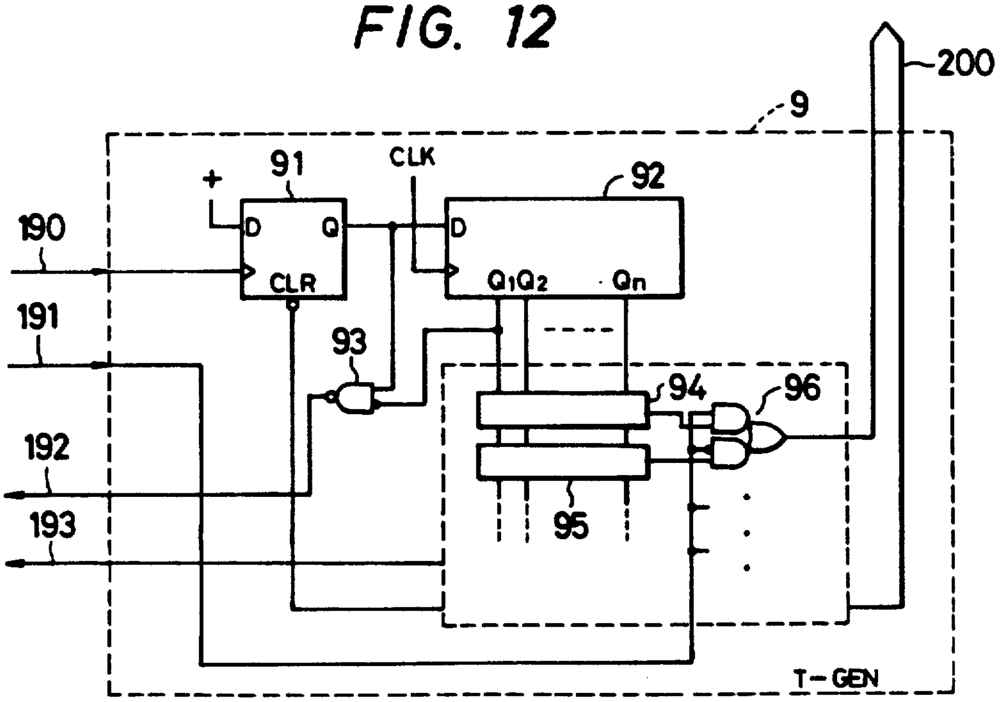
FIG. 12 shows a circuit diagram of a timing generator 9 shown in FIGS. 2 and 8.

FIG. 12 shows a circuit diagram of an embodiment of the T-GEN9. The numerals 91, 92, 93, 94, 95 and 96 denote a D type flip flop (FF), a shift register (hereinafter, SR), an AND date, a timing generator for data transfer, an access timing generator, and a data switching gate, respectively. When the access request signal 190 becomes "1", the DFF91 is set, and the level "1" is sequentially shifted from the stage $Q_1$ to the stage $Q_2$ of the SR92. As a result, the access of the VRAM10 is started, and the reply signal 192 produced by the AND gate 93 becomes "0" in the predetermined period.

Further, the discriminating signal 191 selects one of outputs of the timing generator 94 and the access timing generator 95, so that the selected output is supplied to the VRAM10 as timing signals. The access cycle signal 193 can be generated by decoding the outputs of the SR92. Since the embodiments shown in FIGS. 11 and 12 are only examples, it is possible to use another circuit constructions for the ARB8 and the T-GEN9.

According to the above mentioned embodiments, the access start disable signal is generated prior to the data transfer from the DAM part to the SAM part. In the VRAM10 using the dual-port memory, it is necessary to consider a refresh of the memory. For example, when a dual-port memory of 256 rows necessary to be refreshed during 4 m sec is used as the VRAM10, it have to be refreshed twice each horizontal scanning with the horizontal scanning frequency, for example, 32 kHz. In order to control the refresh operation without competition of the data transfer of the read access for display, the refresh will be easily executed during non-display periods which are detected from the timings supplied from the DC1. Therefore, it will be explained in the following description that the refreshes are executed in the non-display periods of the DC1 with synchronized to the DC1. As a result, since the refreshes become asynchronious with the timing for the drawings of the CPU50, competition between the draw access of the CPU50 and the refresh generates.

It is easy to control the competition by using the same principle as mentioned in the above embodiments.

A second embodiment solves the competition between the draw access and the refresh. The refresh is executed during the latter two cycles of the D-CLK, when the HSYNC is "1". An access start disable signal for the refresh and a refresh timing signal are produced, respectively. The access start disable signal becomes active from a timing $\gamma''$ which is $t_{cyc}(\max)$ just prior to a refresh start timing $\beta''$. As being described in detail above, the draw access of the CPU50 generated before the timing γ'' completely terminates until the timing β'' and the refresh can be started from the timing β''. Further, the draw access generated after the timing γ'' is kept waiting until the end of the refresh.

A circuit diagram of the second embodiment of the present invention, which provides a refresh operation, includes a part of the circuit shown in FIG. 6. An access start disable signal for the refresh is an output of the FF20-1. Also, the refresh timing signal can be produced by an AND gate supplied with the output of the FF20-1 and an output of the FF20-3. That is, by utilizing the AD-DET 2 and the DTX-DET3 for the data transfer, it become possible to get the timings for the refresh without increasing the circuit amount.

The access start disable signal for the refresh and the refresh timing signal are provided to the ARB, so that a refresh control signal is generated from the T-GEN and the VRAM10 is refreshed. As it is obvious for an average technical person in this technical area to construct concrete embodiments of the ARB and the T-GEN for the refresh, their circuit configuration is omitted. In the explanation above, the refresh is executed during the latter two cycles of the D-CLK, but refresh can be done anytime after the timing ε during the non-display period.

To illustrate the second embodiment of the present invention described above FIGS. 13A-13D and 14 are provided. FIGS. 13A-13D illustrate the waveforms for the second embodiment described above. FIG. 14 illustrates the details of the circuit of the second embodiment described above.

In FIGS. 13A-13D the H-SYNC is shown as waveform 120-a and DCLK is shown as waveform 120-c. The start disable signal is shown as waveform 151 and the refresh timing signal is shown as waveform 161.

In FIG. 14 the network of flip-flops FF20-1 to FF20-4 is shown connected to the AND gate shown as element 26. As described above, the network of flip-flops FF20-1 to FF20-4 and AND gate 26 receive H-SYNC and DCLK and receives and outputs the start disable signal 151 and the refresh timing signal 161 respectively.

As being explained in detail above, the present invention can be also applied to another types of display apparatus in which a frame buffer is sequentially read-accessed for display. For example, a liquid crystal device (LCD), an electroluminescence panel (EL), a plasma display panel, etc. can be used as the DISP54. Further, the Di/F 53 can be constructed by a parallel-serial converter or contain a character generator for converting codes to image data.

According to the present invention, even if the display operation of the display apparatus is asynchronously executed from the data drawing, there is no noise of display screen. Therefore, it becomes possible to execute data drawing to the frame buffer with high speed.

Further, according to the present invention, it becomes possible to execute the R data transfer with increase of a small amount of hardware.

What is claimed is:

1. A display system using a multi-port memory having at least a random access memory part and a serial access memory part as a frame buffer and a raster scan type display for displaying data read out from the frame buffer, comprising:

a display controller for producing address bits for the multi-port memory for data transfer from the random access memory part to the serial access memory part and for generating a synchronizing signal for synchronizing operation of the raster scan type display;

first means for generating an access start disable signal just prior to said data transfer based on said synchronizing signal, said access start disable signal having an active period being equal to or longer than an access cycle time of drawing data to the multi-port memory;

means for disabling a drawing access to the multi-port memory when said access start disable signal is active; and second means connected to said display controller for generating a timing signal for said data transfer in response to said address bits corresponding to columns of said multi-port memory so that data, corresponding to a scanning line, on the display means, which is stored in a plurality of rows of the random access memory part, is transferred to the display means in real time.

2. A display system according to claim 1, wherein:

said first generating means generates said access start disable signal by using a horizontal synchronizing signal as said synchronizing signal.

3. A display system according to claim 1, wherein:

said first generating means generates said access start disable signal by using said address bits corresponding to columns of said multi-port memory.

4. A display system including display means, a multi-port memory as a frame buffer for display which has at least a random access memory part and a serial access memory part, means for drawing display data to the multi-port memory and a display controller for generating a plurality of synchronizing signals for synchronizing operation of the display means and address signals of the multi-port memory at a read access for display, comprising:

first producing means for producing a timing signal of a data transfer from the random access memory part to the serial access memory part at the read access for display;

means for generating an access start disable signal just prior to said data transfer, said access start disable signal having an active period which is equal to or longer than an access cycle time of the drawing means;

means for disabling a draw access from the drawing means to the multi-port memory when said access start disable signal is active; and second producing means connected to the display controller for producing a timing signal of a real time data transfer in response to the address signals of columns of said multi-port memory so that data, corresponding to a scanning line, on the display means, which is stored in a plurality of rows of the random access memory part, is transferred to the display means in real time.

5. A display system according to claim 4, wherein:

said second producing means includes a detector for detecting a timing at which the address signals corresponding to columns of the multi-port memory become zero so as to produce said timing signal of said real time data transfer.

6. A display system according to claim 4, wherein:

said generating means includes means connected to the display controller for detecting a timing signal at which the address signals of the column become a predetermined value and a generator for generating said access start disable signal just prior to said real time data transfer based on a last occurring timing signal.

7. A display including display means, a multi-port memory as a video random access memory for display which has at least a random access memory part and a serial access memory part, means for drawing display data to the multi-port memory and a display controller for generating a plurality of synchronizing signals for synchronizing operation of the display means and address signals of the multi-port memory during a read access for display comprising:

means for producing a timing signal of a data transfer from the random access memory part to the serial access memory part at the read access for display; and said producing means having a first timing producer for producing said timing signal in response to the synchronizing signals from the display controller and a second timing producer for producing said timing signal in response to the address signals of columns of the multi-port memory so that the display data, corresponding to a scanning line, on the display means, which is stored in a plurality of rows of the random access memory part, between a first column of a first row and a second column of a second row, is transferred to the display means in real time, said first and second columns being columns other then first and last columns of a row.

8. A display system according to claim 7, wherein:

said second timing producer produces the timing signal when the address signals of the columns become all zero.

9. A display system including display means, a multi-port memory as a video random access memory for display which has at least a random access memory part and a serial access memory part, means for drawing display data to the multi-port memory and a display controller for generating a plurality of synchronizing signals for synchronizing operation of the display means and address signals of the multi-port memory during a read access for display comprising:

means for producing a timing signal of a data transfer from the random access memory part to the serial access memory part at the read access for display;

said producing means having a first timing producer for producing said timing signal in response to the synchronizing signals from the display controller and a second timing producer for producing said timing signal in response to the address signals of columns of the multi-port memory so that the display data, corresponding to a scanning line, on the display means, which is stored in a plurality of rows of the random access memory part, is transferred to the display means in real time;

means for generating an access start disable signal just prior to said data transfer, said access start disable signal having an active period which is equal to or longer than an access cycle time of the drawing means; and means for disabling a draw access from the drawing means to the multi-port memory when said access start disable signal is active.

10. A display system according to claim 9, wherein:

said generating means having a first generator for generating said access start disable signal in response to the synchronizing signals and a second generator for generating said access disable signal in response to the address signals of the columns.

11. A display system according to claim 10, wherein:

said second generator generates said access disable signal when the address signals of the columns become a predetermined value.

12. A display system including display means, a multi-port memory as a video random access memory for display which has at least a random access memory part and a serial access memory part, means for drawing display data to be multi-port memory and a display controller for generating a plurality of synchronizing signals for synchronizing operation of the display means and address signals of the multi-port memory during a read access for display, comprising:

means for producing a timing signal of a data transfer from the random access memory part to the serial access memory part at the read access for display in response to the address signals of columns of the multi-port memory so that the display data, corresponding to a scanning line, one the display means, which is stored in a plurality of rows of the random access memory part, between a first column of a first row and a second column of a second row, is transferred to the display means in real time, said first and second columns being columns other than first and last columns of a row.

13. A display system according to claim 12, wherein:

said producing means includes a detector means for detecting a timing at which the address signals of the columns of the multi-port memory become a predetermined value so as to produce said timing signal of said data transfer.

14. A display system including display means, a multi-port memory as a video random access memory for display which has at least a random access memory part and a serial access memory part, means for drawing display data to the multi-port memory and a display controller for generating a plurality of synchronizing signals for synchronizing operation of the display means and address signals of the multi-port memory during a read access for display, comprising:

means for producing a timing signal of a data transfer from the random access memory part to the serial access memory part at the read access for display in response to the address signals of columns of the multi-port memory so that the display data, corresponding to a scanning line, on the display means, which is stored in a plurality of rows of the random access memory part, is transferred to the display means in real time; and first means for generating a first access start disable signal for disabling a draw access request from the drawing means just prior to said timing signal when the address signals of the columns become a predetermined value.

15. A display system including display means, a multi-port memory as a video random access memory for display which has at least a random access memory part and a serial access memory part, means for drawing display data to the multi-port memory and a display controller for generating a plurality of synchronizing signals for synchronizing operation of the display means and address signals of the multi-port memory during a read access for display, comprising:

means for producing a timing signal of a data transfer from the random access memory part to the serial access memory part at the read access for display in response to the address signals of columns of the multi-port memory so that the display data, corresponding to a scanning line, on the display means, which is stored in a plurality of rows of the random access memory part, is transferred to the display means in real time; and second means for generating a second access start disable signal for disabling a draw access request from the drawing means just prior to a refresh timing signal.

16. A display system according to claim 15, wherein:

said second access start disable signal is generated based on the synchronizing signals from the display controller.

17. A method for transferring video data from random access memory parts to serial access memory parts of multi-port random access memory means, the video data read out from the multi-port random access memory means being displayed on raster scan type display means, comprising the steps of:

drawing the video data into the random access memory parts, so that the video data corresponding to one scanning line of the display means is stored on a plurality of rows of each of the random access memory parts;

initially transferring the video data, corresponding to said one scanning line from the first row of said plurality of rows, to said serial access parts, in response to a read access signal and address signals of the multi-port random access memory;

serially reading out said video signal transferred to the serial access parts; and continuing the transfer of said video data corresponding to said one scanning line to said serial access parts, from a row successive to the first row in response to a first timing signal which is generated at a time when said address signals of the columns of each of the random access memory parts become a first predetermined value, so that the video data, corresponding to said one scanning line of the display means stored on a plurality of rows of the random access memory means, is transferred in real time to the display means.

18. A transferring method according to claim 17, further comprising the step of:

converting the video data, which is output in parallel to said serial access memory parts into a serial video signal to be supplied to the display means.

19. A transferring method according to claim 17, further comprising the step of:

disabling a draw access to the random access memory parts prior to said initially transferring step in response to a second timing signal which is generated at a time that said address signals of the columns of each of the random access memory parts become a second predetermined value.

20. A display system using raster scan type display means for displaying video data, comprising:

multi-port memory means having a plurality of multi-port memories, which have random access memory parts and serial access memory parts, for storing the video data;

means for drawing the video data into said random access memory parts of said multi-port memory means;

display controlling means for generating address signals supplied to said multi-port memory means and a synchronization signal for synchronizing operation of the display means;

first producing means for producing a first timing signal of a data transfer from said random access memory parts to said serial access memory parts at a read access for display in response to said address signals of the columns of said random access memory parts so that video data, corresponding to a scanning line on the display means, which is stored in a plurality of rows between a first column of a first row and a second column of a second row, is transferred to the display means in real time, said first and second columns being columns other than first and last columns of a row; and display interface means placed between said multi-port memory means and the display means for converting parallel bits of the video data output from said multi-port memories into a serial bit signal to be supplied to the display means.

21. A display system according to claim 20, wherein said display interface means includes a parallel to serial converter, and wherein a number of said parallel bits corresponds to the number of said random access memory parts.

22. A display system according to claim 21, wherein said first producing means produces said first timing signal, when said address signals become a predetermined value.

23. A display system using raster scan type display means for displaying video data, comprising:

multi-port memory means having a plurality of multi-port memories, which have random access memory parts and serial access memory parts, for storing the video data;

means for drawing the video data into said random access memory parts of said multi-port memory means;

display controlling means for generating address signals supplied to said multi-port means and a synchronization signal for synchronizing operation of the display means;

first producing means for producing a first timing signal of a data transfer from said random access memory parts to said serial access memory parts at a read access for display in response to said address signals of the columns of said random access memory parts so that video data, corresponding to a scanning line on the display means, which is stored in a plurality of rows is transferred to the display means in real time;

display interface means placed between said multi-port memory means and the display means for converting parallel bits of the video data output from said multi-port memories into a serial bit signal to be supplied to the display means;

said display interface means includes a parallel to serial converter, and wherein a number of said parallel bits corresponds to the number of said random access memory parts;

said first producing means produces said first timing signal, when said address signals become a predetermined value;

first generating means for generating a first access start disable signal having an active period which is equal to or longer than an access cycle of said drawing means in response to said address signals; and means for disabling a draw access of said drawing means prior to said data transfer in response to said first access start disable signal.

24. A display system according to claim 23, further comprising:

second producing means for producing a second timing signal of said data transfer in response to said synchronization signal.

25. A display system according to claim 24, further comprising:

second generating means for generating a second access start disable signal having an active period which is equal to or longer than the access cycle of said drawing means in response to said synchronization signal; and wherein said disabling means disables said draw access in response to said second access start disable signal.

* * * * *